April 30, 1935. T. L. PARKER 1,999,475
MOUNTING FOR ELECTRICAL DEVICES
Filed Jan. 20, 1932      2 Sheets-Sheet 1
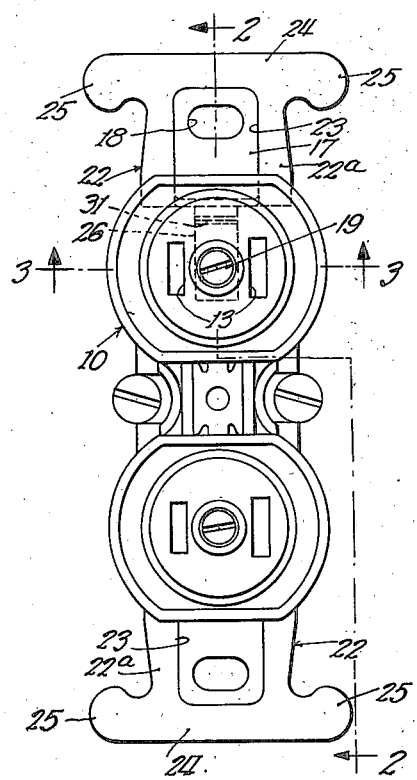
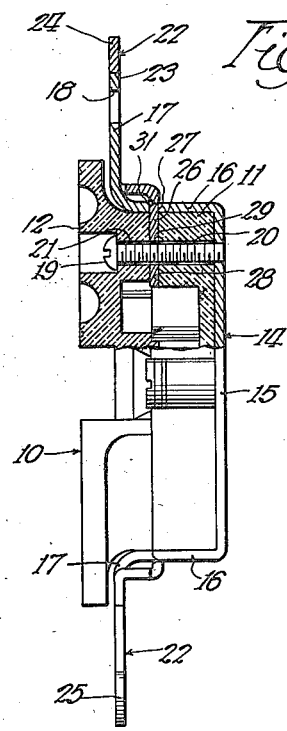
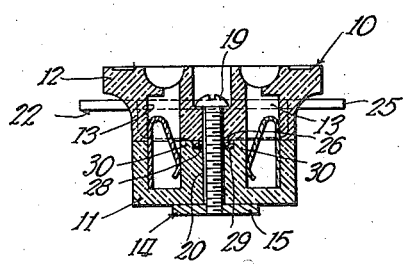
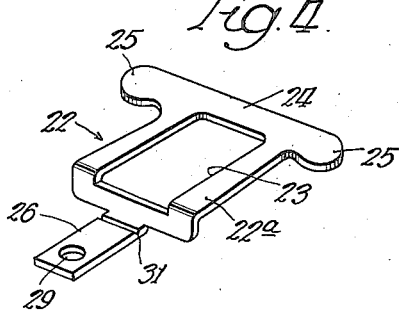
Witness
V. Siljander
Inventor
Thomas L. Parker
By Hill & Hill Attys.

April 30, 1935.  T. L. PARKER  1,999,475
MOUNTING FOR ELECTRICAL DEVICES
Filed Jan. 20, 1932  2 Sheets-Sheet 2
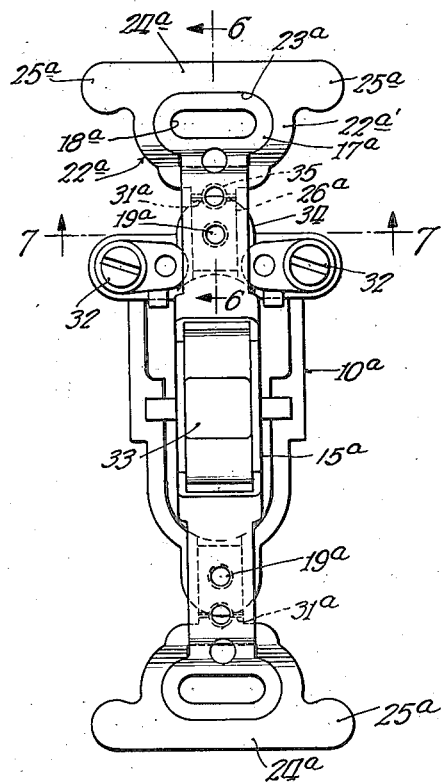
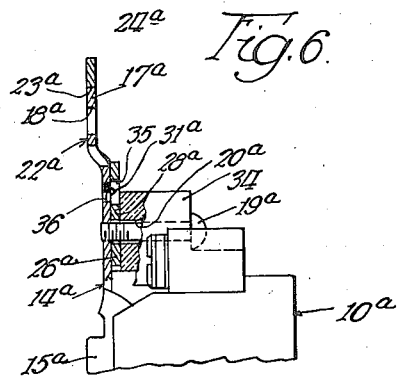
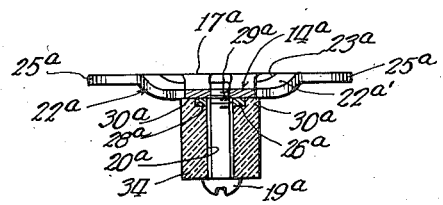
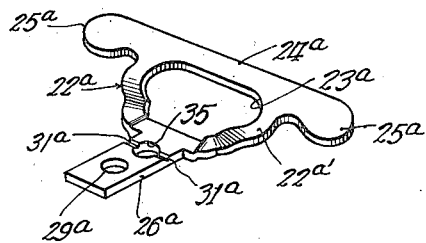
Witness
V. Siljander
Inventor
Thomas L. Parker
By: Hill & Hill, Attys Patented Apr. 30, 1935

1,999,475

UNITED STATES PATENT OFFICE 1,999,475

MOUNTING FOR ELECTRICAL DEVICES

Thomas L. Parker, Chicago, Ill., assignor to The Standard Electric Manufacturing Co., Chicago, Ill., a corporation of Illinois Application January 20, 1932, Serial No. 587,724

12 Claims. (Cl. 247—20)

This invention relates to electrical devices, and more particularly to a novel construction and arrangement of elements for positioning such devices with respect to walls, or the like, in which the devices may be mounted.

One object of the present invention is to provide a novel construction and arrangement of leveling means for positioning plug or switch receptacles with respect to the surface of the wall, or the like, in which they are mounted.

Another object of the invention is to provide a novel arrangement of the leveling brackets and means for connecting them to a conventional form of plug or switch receptacle.

Another object of the invention is to provide a novel arrangement of leveling means and an electrical device whereby the leveling means may be rigidly secured to and between portions of the device by the means employed for securing the said portions of the device together.

A further object of the invention is to provide leveling means of the character described which may be readily removed without disturbing any portion of the device to which they are attached.

A still further object of the invention is to improve devices of the character described in sundry details hereinafter referred to and particularly pointed out in the appended claims.

Illustrative embodiments of the present invention are shown in the accompanying drawings in which Fig. 1 is an elevational face view of a double plug receptacle embodying features of the present invention, and illustrating the application and arrangement of my improved leveling means with respect thereto;

Fig. 2 is an elevational view partly in section of the structure shown in Fig. 1, and taken substantially as indicated by the line 2—2 thereof;

Fig. 3 is a transverse sectional view taken substantially as indicated by the line 3—3 of Fig. 1;

Fig. 4 is a perspective view of one of the leveling brackets illustrated in Figs. 1, 2 and 3;

Fig. 5 is an elevational face view of a switch receptacle illustrating the application and arrangement of my improved leveling means with respect thereto;

Fig. 6 is a fragmentary elevational view partly in section of a portion of the structure illustrated in Fig. 5, and taken substantially as indicated by the line 6—6 thereof;

Fig. 7 is a transverse sectional view taken as indicated by the line 7—7 of Fig. 5; and Fig. 8 is a perspective view of one of the leveling brackets illustrated in Figs. 5, 6 and 7.

Referring particularly to Figs. 1 to 4, inclusive, of the drawings, a double flush plug receptacle is indicated as a whole by the numeral 10 and comprises, in the present instance, a base 11 and a cap 12 having the usual recesses 13 formed therein for receiving the terminals or blades of a plug connection, as is well understood in devices of the character described.

For mounting the receptacle 10 in an outlet box, or the like (not shown), a yoke or supporting member, indicated as a whole by the numeral 14, is positioned adjacent one side of the receptacle and comprises a central portion 15 extending along the rear side of the receptacle and having leg portions 16 bent laterally or forwardly to form a U-shaped structure, the leg portions 16 being bent outwardly to form end portions 17 of the supporting member, the said end portions being provided with apertures 18 adapted to receive screws (not shown) for securing the supporting member to an outlet box or the like as is common practice in mounting devices of the character described.

For securing the base 11 and cap 12 of the receptacle together, and for securing the receptacle to the supporting member 14, threaded screw bolts 19 are adapted to extend through apertures 20 and 21 formed in the base and cap 11 and 12, respectively, the bolts 19 being screw-threaded into the portion 15 of the supporting member as clearly shown in Figs. 2 and 3.

It is well known that outlet boxes are frequently installed in walls at various angles and out of alignment with the face of the wall, and to facilitate the positioning of the receptacles in proper alignment with the wall surface, leveling means are employed.

The leveling means of the present structure are shown as brackets indicated as a whole by the numeral 22 positioned adjacent opposite ends of the receptacle, the brackets 22, in the present instance, each comprising a relatively wide portion 22a having an aperture 23 formed therein adapted to receive the end portion 17 of the supporting member 14 in a manner to permit the end portion 17 to occupy a position, normally, in substantially the plane of the relatively wide portion 22a of the bracket 22, and to permit relative movement of the portion 17 of the supporting member with respect to the bracket 22. Formed adjacent the outer end of the brackets 22 is a wall engaging portion 24 having laterally extending ears 25 adapted to provide a substantial area for engagement with the surface of the wall in which the outlet box and receptacle are mounted.

For securing the brackets 22 to the receptacle, an integral offset shank portion 26 is provided adjacent the opposite or inner end of the bracket and adapted to extend through elongated apertures 27 formed in the leg portions 16 of the supporting member 14, and into channels 28 shown, in the present instance, as formed in the base 11 of the receptacle, the shank portion 26 having an aperture 29 formed therein for receiving the screw bolt 19 in a manner to secure the shank portion 26 rigidly to the receptacle and between the base 11 and cap 12 thereof, the portions 30, forming the opposite sides of the channel 28, engaging the opposite edges of the shank portion 26 in a manner to retain the bracket against lateral or oscillating movement with respect to the screw bolt 19.

For providing a structure wherein the wall engaging portions of the leveling brackets 22 may be readily removed, in the event that their use is unnecessary or undesirable, the shank portion 26 is shown, in the present instance, as having a laterally extending notch or groove 31 formed in one face thereof to provide a weakened portion at which the outer or relatively wide portions 22a of the brackets may be broken off merely by bending them down against the rear end portions of the receptacle.

It will be observed from the foregoing description that the present invention provides a novel construction and arrangement of leveling means adapted for attachment to a conventional form of plug receptacle, wherein the leveling means are secured rigidly to and between portions of the device by the means employed for securing the said portions of the device together, and that by weakening the shank portion as indicated at 31, the wall engaging portions of the leveling means may be readily removed, if desired, without disturbing any portion of the device to which they are attached.

Figs. 5 to 8, inclusive, illustrate the application of the present invention to an electrical device in the nature of a wall switch comprising a receptacle in which the switch mechanism is mounted, the receptacle being indicated as a whole by the numeral 10a and having contact terminals 32 mounted thereon.

For mounting the receptacle 10a in an outlet box, or the like (not shown), a bridge piece or supporting member, indicated as a whole by the numeral 14a, is positioned adjacent one side of the receptacle and comprises a central portion 15a extending along the front side of the receptacle, and in which a switch toggle lever 33 is mounted, the supporting member 14a having end portions 17a provided with apertures 18a adapted to receive screws (not shown) for securing the supporting member 14a to an outlet box, or the like, as is common practice in mounting devices of the character described.

For securing the receptacle 10a to the supporting member 14a, threaded screw bolts 19a are adapted to extend through apertures 20a formed in bosses 34 adjacent the ends of the receptacle, the bolts 19a being screw-threaded into the supporting member 14a as clearly shown in Figs. 6 and 7.

To facilitate the positioning of switch receptacles in proper alignment with the wall surface regardless of the position of the outlet box with reference thereto, leveling means are employed and shown in the present structure as comprising brackets indicated as a whole by the numeral 22a positioned adjacent opposite ends of the receptacle, the brackets 22a, in the present instance, each comprising a relatively wide portion 22a' having an aperture 23a formed therein adapted to receive the end portion 17a of the supporting member 14a in a manner to permit the end portion 17a to occupy a position, normally, in substantially the plane of the relatively wide portion 22a' of the bracket 22a, and to permit relative movement of the portion 17a of the supporting member with respect to the bracket 22a. Formed adjacent the outer end of the brackets 22a is a wall engaging portion 24a having laterally extending ears 25a adapted to provide a substantial area for engagement with the surface of the wall in which the outlet box and receptacle are mounted.

For securing the brackets 22a to the receptacle, an integral offset shank portion 26a is provided adjacent the opposite or inner end of the bracket and adapted to extend into a channel 28a shown, in the present instance, as formed in the boss 34 of the receptacle 10a, the shank portion 26a having an aperture 29a formed therein for receiving the screw bolt 19a in a manner to secure the shank portion 26a rigidly to the receptacle and between the front face thereof and the supporting member 14a, the portions 30a, forming the opposite sides of the channel 28a engaging the opposite edges of the shank portion 26a in a manner to retain the bracket 22a against lateral or oscillating movement with respect to the screw bolt 19a.

For providing a structure wherein the wall engaging portions of the leveling brackets 22a may be readily removed, in the event that their use is unnecessary or undesirable, the shank portion 26a is shown in the present instance, as having laterally extending aligned notches or grooves 31a formed in one face thereof at opposite sides of a clearance opening 35 formed in the shank portion, the notches or grooves 31a being intended to provide a weakened portion at which the outer or relatively wide portions 22a' of the brackets may be broken off merely by bending them down against the rear end portions of the receptacle. The apertures 35, in the present instance, are merely clearance openings adapted to receive the ends of screws (not shown) intended to be screw-threaded into apertures 36 formed in the supporting member 14a for securing a cover plate to the device in position against the face of the wall in which the outlet box and the device are mounted.

It will be observed from the foregoing description that the present invention also provides a novel construction and arrangement of leveling means adapted for attachment to a conventional form of switch receptacle, wherein the leveling means are secured rigidly to and between portions of the device by the means employed for securing the said portions of the device together, and that by weakening the shank portion 26a as indicated at 31a, the wall engaging portions of the leveling means may be readily removed, if desired, without disturbing any portion of the device to which the leveling means are attached.

Obviously, the present invention is not limited to the precise construction and arrangement shown and described, as the same may be variously modified. Moreover, all the features of the invention need not be used conjointly, as the same may be used to advantage in variously different combinations and sub-combinations.

What I claim as new and desire to cover by Letters Patent is:

1. In a device of the class described, the combination with an electrical receptacle and supporting means therefor, of wall engaging means secured to said receptacle intermediate a portion thereof and said supporting means.

2. In a device of the class described, the combination with an electrical receptacle and supporting means therefor, of wall engaging means rigidly secured to said receptacle between a portion thereof and said supporting means, and means formed on said receptacle for maintaining said wall engaging means in substantially fixed alignment with respect to the receptacle.

3. In a device of the class described, the combination with an electrical receptacle and supporting means therefor, of wall engaging means separate from said supporting means and mounted on said receptacle intermediate a portion thereof and said supporting means, and means for securing said supporting means and wall engaging means to the receptacle.

4. In a device of the class described, the combination with an electrical receptacle and supporting member therefor, of wall engaging means separate from said member and mounted on said receptacle intermediate a portion thereof and said supporting member, and a screw bolt threaded into said member and operatively related to the receptacle and said wall engaging means for securing said supporting member and wall engaging means to the receptacle.

5. In a device of the class described, the combination with an electrical receptacle and supporting means therefor, of wall engaging means mounted on said receptacle intermediate a portion thereof and said supporting means, and means operatively related to said receptacle and engageable with said supporting means for securing said wall engaging means to the receptacle.

6. In a device of the class described, the combination with an electrical receptacle and supporting means therefor, of wall engaging brackets having openings therein adapted to receive the ends of said supporting means, and means for securing said receptacle and supporting means together and for securing said brackets to said receptacle intermediate a portion thereof and said supporting means.

7. In a device of the class described, the combination with an electrical receptacle and supporting means therefor, of wall engaging brackets having openings therein adapted to receive the end portions of said supporting means in a manner to lie in the plane of said brackets, and means for securing said receptacle and supporting means together and for securing said brackets to said receptacle intermediate a portion thereof and said supporting means.

8. In a device of the class described, the combination with an electrical receptacle and supporting means therefor, of wall engaging brackets comprising relatively wide and narrow portions and having transversely extending channels formed in one side of said brackets, said wider portions of the brackets having openings formed therein adapted to receive the respective end portions of said supporting means in a manner to lie in the plane of said wider portion of the brackets, and means for securing said receptacle and supporting means together and for securing the brackets to said receptacle.

9. In a device of the class described, the combination with an electrical receptacle and supporting means therefor, of wall engaging brackets comprising relatively wide and narrow portions and having transversely extending channels formed in one side of the respective narrower portions, said wider portions of the brackets having openings formed therein adapted to receive the respective end portions of said supporting means in a manner to lie in the plane of said wider portion of the brackets, and means for securing said receptacle and supporting means together and cooperable with said narrower portions for securing the brackets to said receptacle.

10. In a device of the class described, the combination with a receptacle, a supporting bar therefor and means for securing said receptacle and bar together, of wall engaging brackets having openings formed therein adapted to receive the end portions of said bar in a manner to position the said end portions in substantially the plane of said brackets, an offset shank portion formed on the respective brackets and adapted to be positioned between said receptacle and bar, said shank portion having an aperture formed therein and adapted to receive said securing means.

11. In a device of the class described, the combination with a receptacle, a supporting bar therefor and means for securing said receptacle and bar together, of wall engaging brackets having openings formed therein adjacent their central portion and adapted to receive the end portions of said bar in a manner to position the said end portions in substantially the plane of said brackets, a weakened offset shank portion formed on the respective brackets and adapted to be positioned adjacent said receptacle and bar, said shank portion having an aperture formed therein and adapted to receive said securing means.

12. In a device of the class described, the combination with a receptacle, a supporting bar therefor and means for securing said receptacle and bar together, of wall engaging brackets having openings formed therein adapted to receive the end portions of said bar in a manner to position the said end portions in substantially the plane of said brackets, an offset shank portion formed on the respective brackets and adapted to be positioned between said receptacle and bar, said shank portion having an aperture formed therein and adapted to receive said securing means, and means formed on said receptacle and engageable with said shank portions for retaining the brackets in substantially fixed position with respect to the receptacle.

THOMAS L. PARKER.